Dec. 3, 1935.   V. J. PERSIANI   2,022,940
APPARATUS FOR COOKING
Filed Oct. 5, 1934
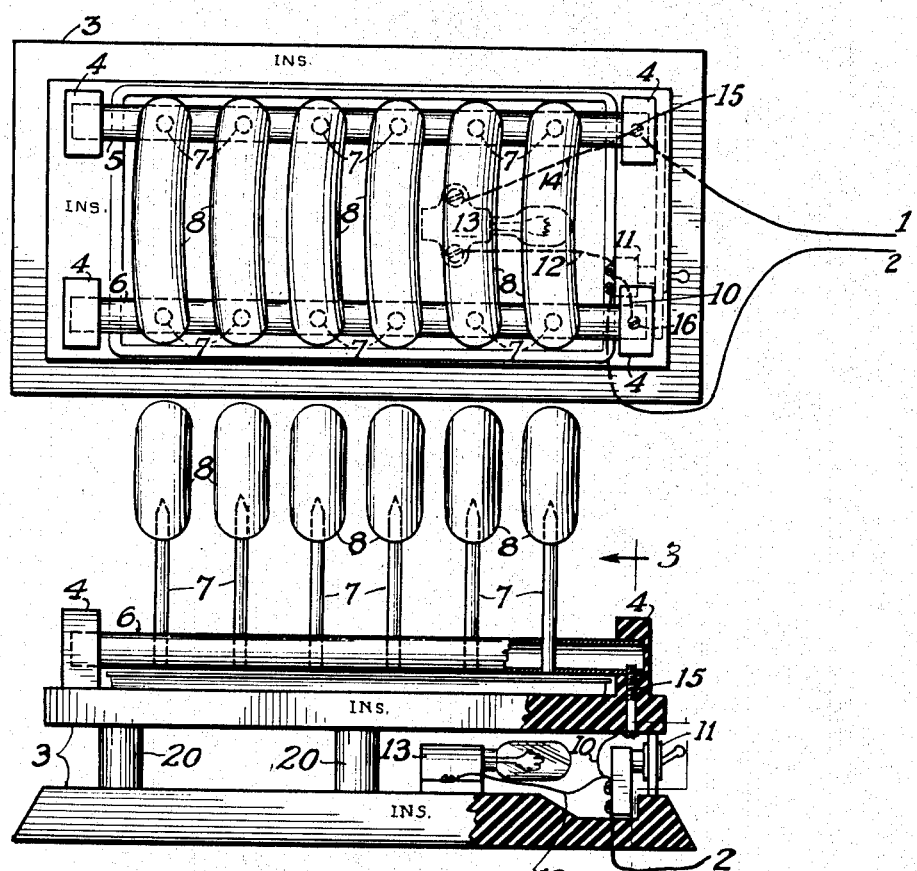
Fig. 1.
Fig. 2.
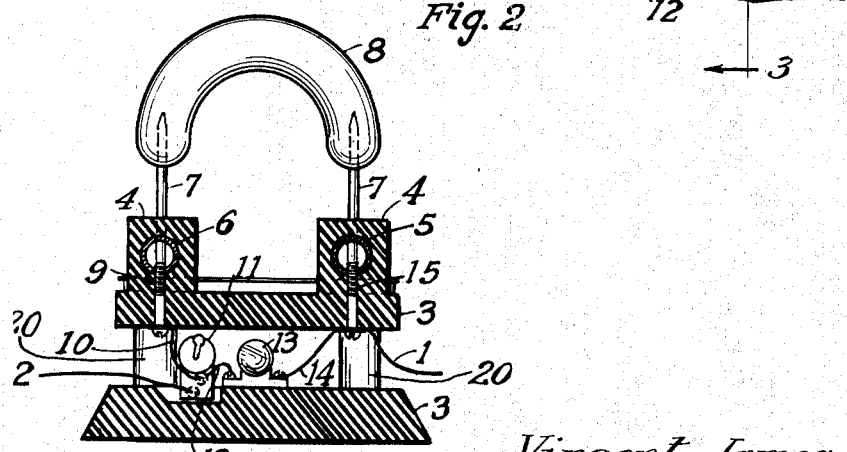
Fig. 3.
INVENTOR.
Vincent James Persiani
BY
Williams, Bradbury, McCaleb & Hinkle
ATTORNEYS.

Patented Dec. 3, 1935

2,022,940

UNITED STATES PATENT OFFICE 2,022,940

APPARATUS FOR COOKING

Vincent James Persiani, Chicago Heights, Ill.

Application October 5, 1934, Serial No. 747,001

1 Claim. (Cl. 219—19)

The present invention relates to methods and apparatus for cooking, and is particularly concerned with methods and devices for the cooking of Frankfurters or wieners, but may also be applied to cooking other types of suitable foods.

One of the objects is the provision of an improved method and apparatus for cooking meats on short order by means of which the meats may be more quickly cooked than with the devices of the prior art.

Another object of the invention is the provision of an improved method and apparatus adapted to cook wieners or Frankfurters or other meats in such manner as to retain the savory meat juices within the finished product and to produce a more nutritious and palatable product.

Another object of the invention is the provision of an improved method and apparatus for cooking foods of the class described which is adapted to be used for one or any number of portions of meat by simply applying the meat to the apparatus, and in which there is no consumption of electrical energy beyond that used for the number of portions to be cooked.

In many of the cooking devices it is necessary to maintain at a suitable heat a relatively large plate, large enough to accommodate as many food portions as might possibly be ordered, and a considerable amount of energy is consumed in merely maintaining the plate heated, even though no food is being cooked.

One of the objects of the present invention is to confine the consumption of electrical energy to a minimum, since the device merely uses current when a food portion is being cooked, and it is not necessary to maintain the device in a heated condition, and the amount of energy used is strictly proportional to the amount of food cooked.

Other objects and advantages of the invention will be apparent from the following description and the accompanying sheet of drawing, in which similar characters of reference indicate similar parts:

Referring to the drawing:

Fig. 1 is a top plan view of one type of apparatus, which may be utilized to carry out the present method;

Fig. 2 is a side elevational view of the same apparatus with part of the mechanism broken away to show the details of construction in section;

Fig. 3 is a transverse sectional view taken on the plane of the line 3—3 of Fig. 2, looking in the direction of the arrows.

Referring to the drawing, the present apparatus is preferably mounted upon a suitable base 3, which may consist of one or two parts as shown, and is preferably constructed of insulating material, such as "Bakelite", porcelain, wood, or any suitable insulator. The parts of the base 3 may comprise a pair of flat plates joined by the legs 20, and the upper portion of the base 3 may be in the shape of a pan for the purpose of gathering any drippings which may drop from the Frankfurters or other meats being cooked. The base 3 is provided with a plurality of upwardly extending insulating lugs 4, each of which has a cylindrical aperture for receiving a conducting bar, rod or tube 6.

In the present embodiment the member 6 is made in the form of a tube, preferably of electrical conducting material, such as copper, but it may be made in any suitable non-corrodible metal, and in any suitable transverse section. The tubes 6 are of sufficient length so that their ends are each received in one of the cylindrical bores in the lugs 4, where they may be secured by set screws 15, which may also be utilized as connectors. The set screw or connecting screw 15 extends through the upper part of the base, and is threaded into the tube 6.

Each of the tubes 6 is provided with a plurality of electrodes 7, which preferably consist of upwardly extending pointed rods which may be secured to the tubes 6 by a drive fit in a cylindrical aperture extending through the walls of the tube. The electrodes 7 may be arranged in any convenient manner, but are preferably so arranged that the Frankfurters may be easily impaled upon two opposite electrodes 7 and so that the Frankfurters complete the electrical circuit from one electrode 7 to the opposite electrode 7.

This is conveniently done when the electrodes extend upwards, since the Frankfurters may be easily curved, as shown in Fig. 3, and the electrode 7 may be driven well into the ends of the Frankfurter 8, so as to secure a good contact between the meat and the electrode.

The device is also preferably provided with an electric switch 11, preferably of the snap type, which controls the circuit from the source of electrical energy to the electrodes 7, and it is also preferably provided with a pilot light 13 secured in a conventional socket carried by the base 3, the pilot light being in parallel with the electrodes 7 so that when the electrodes are energized the pilot light is also illuminated.

The purpose of the pilot light is to indicate to the operator that the electrodes are energized, so as to warn the operator of the necessity for care to avoid an electric shock, and the electricity may be turned off by means of the switch 11 during the placing or removal of the Frankfurter 8, or as soon as the cooking operation has been finished.

The present device may be utilized on an ordinary 110 volt A. C. or D. C. lighting circuit, the conductors 1 and 2 leading to an ordinary connector for connection with a wall socket.

The circuits from the conductors 1 and 2 may be traced as follows: Conductor 1, connecting screw 15, conductor 14, lamp 13, conductor 12, switch 11, to conductor 2. These conductors comprise the circuit through the switch and lamp. Conductor 1, connector screw 15, tube 5, electrode 7, Frankfurter 8, electrode 7, tube 6, connector screw 16, switch 11, and conductor 2, comprise the circuit through the Frankfurter.

The method of cooking the food utilizing this apparatus is as follow: One or more Frankfurters are impaled upon the electrodes 7, with the electrodes penetrating the sausage casing and extending into the meat filling and making contact. The current is turned on at the switch 11, the condition of energization being indicated by the lamp 13, and the current passing through the Frankfurters 8. The amount of current passing through the Frankfurters depends upon the electrical resistance, and due to the electrical resistance of the Frankfurters there is a heating effect of the current in the Frankfurters. This heating effect is concentrated at the meat of the Frankfurter for the reason that the other portions of the circuits, such as the wires, tubes 5 and 6, and electrodes are preferably made of good electrical conducting material such as copper or other suitable metal, and the principal resistance in the circuit is the Frankfurter. Thus all of the electrical energy is concentrated at the point of the cooking.

The amount of cooking necessary to cook the Frankfurter depends upon the condition of the Frankfurter with respect to moisture, length, cross-section, and composition of its meat, all of which factors determine its electrical resistance, but ordinarily a Frankfurter of ordinary type may be fully cooked within sixty to ninety seconds.

It is found that the savory meat juices are thus completely retained in the Frankfurter, which is cooked from the inside out, and there is no danger of the interior of the Frankfurter remaining uncooked, as might be the case where heat is slowly applied from the outside.

The Frankfurters are improved in appearance, taste and quality by the present method, and short orders may be filled almost as quickly as the Frankfurters and accompanying buns can be handled by the operator.

I desire it to be understood that my invention may also be applied to other shapes of electrodes and other types of meats or other foods. The electricity may be applied to meats by large, flat electrodes having a wide area of contact with the meat, and thus meat portions of any different shape may be cooked by the use of suitable electrodes applied to opposite sides of the meat portion for a suitable length of time.

It will thus be observed that I have invented a new method and apparatus for carrying out the method of cooking meats, such as Frankfurters and wieners, and the present method and apparatus produce a finished product which is more delicious, savory and palatable than those produced by the devices of the prior art.

The present device is also capable of economical construction and particularly capable of economical operation, since it utilizes only sufficient energy to heat the Frankfurters themselves instead of heating or maintaining heated any hot plates or other cooking devices. The amount of energy consumed is substantially proportional to the number of Frankfurters cooked, whether it be but one Frankfurter or a large number, and the device is always ready for use and will produce a conveniently cooked product in approximately one minute.

While I have illustrated and described a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim is new and desire to secure by Letters Patent of the United States, is:

In a device for cooking Frankfurters or the like, the combination of a supporting base of insulating material with an electrode supporting member of insulating material carried in spaced relation to said base, said electrode supporting member having a pair of upwardly extending insulating lugs at each end, and the opposite lugs having opposing bores, a pair of tubular metal members mounted in said bores in spaced relation to each other and extending substantially parallel to each other, a plurality of upwardly extending metal prongs mounted in said tubular metal members, said prongs being arranged in pairs opposite to each other and equally spaced longitudinally of said tubular metal members, said tubular metal members being spaced from each other sufficiently so that a Frankfurter may be bent into arcuate form and impaled upon a prong carried by each of said metal members, the prong extending longitudinally into the end of the arcuately shaped Frankfurter, each of said tubular metal members and its prongs constituting an electrode, means for indicating the energization of said electrodes, and means for controlling the energization thereof whereby Frankfurters may be cooked by the passage of electric current through the Frankfurters generating the cooking heat.

VINCENT JAMES PERSIANI.